US011889346B2

(12) United States Patent
Solanki

(10) Patent No.: US 11,889,346 B2
(45) Date of Patent: Jan. 30, 2024

(54) QUALITY-AWARE USER DATA FORWARDING IN MOBILE COMMUNICATIONS SYSTEMS

(71) Applicant: VMware LLC, Palo Alto, CA (US)

(72) Inventor: Deepika Kunal Solanki, Maharashtra (IN)

(73) Assignee: VMware, Inc., Palo Alto, CA (US)

( * ) Notice: Subject to any disclaimer, the term of this patent is extended or adjusted under 35 U.S.C. 154(b) by 25 days.

(21) Appl. No.: 17/699,185

(22) Filed: Mar. 21, 2022

(65) Prior Publication Data

US 2023/0300665 A1 Sep. 21, 2023

(51) Int. Cl.
| | | |
|---|---|---|
| H04W 28/02 | (2009.01) | |
| H04L 45/42 | (2022.01) | |
| H04L 12/46 | (2006.01) | |
| H04L 45/302 | (2022.01) | |
| H04L 45/24 | (2022.01) | |

(52) U.S. Cl.
CPC ..... *H04W 28/0268* (2013.01); *H04L 12/4633* (2013.01); *H04L 45/24* (2013.01); *H04L 45/302* (2013.01); *H04L 45/42* (2013.01)

(58) Field of Classification Search
CPC ... H04L 12/4633; H04L 45/24; H04L 45/302; H04L 45/42; H04W 28/0268
See application file for complete search history.

(56) References Cited

U.S. PATENT DOCUMENTS

| | | |
|---|---|---|
| 6,711,152 B1 | 3/2004 | Kalmanek, Jr. et al. |
| 7,068,667 B2 | 6/2006 | Foster et al. |
| 8,671,176 B1 | 3/2014 | Kharitonov et al. |
| 10,320,681 B2 | 6/2019 | Hira et al. |

(Continued)

FOREIGN PATENT DOCUMENTS

| | | |
|---|---|---|
| CN | 103312607 A | 9/2013 |
| CN | 104995880 A | 10/2015 |

(Continued)

OTHER PUBLICATIONS

Nanxi Kang et al., "Optimizing the "One Big Switch" Abstraction in Software-Defined Networks", CoNEXT'13, Dec. 9-12, 2013, ACM.

(Continued)

*Primary Examiner* — George C Neurauter, Jr.
(74) *Attorney, Agent, or Firm* — King Intellectual Asset Management

(57) ABSTRACT

Example methods and systems for quality-aware user data forwarding in a mobile communications system are described. One example may involve a first virtualized network function (VNF) instance supported by a computer system establishing a user plane tunnel with a second VNF instance; and learning path quality information associated with multiple paths over the user plane tunnel. In response to receiving a packet that includes user data for forwarding in an uplink direction or a downlink direction, the first VNF instance may select the first path over the second path based on at least the path quality information; and generate and send an encapsulated packet over the user plane tunnel towards the second VNF instance. The encapsulated packet may include the packet and an outer header specifying the first outer source port number associated with the first path.

21 Claims, 7 Drawing Sheets

(56) References Cited

U.S. PATENT DOCUMENTS

| | | | |
|---|---|---|---|
| 10,484,307 B2* | 11/2019 | Heinonen | H04W 4/70 |
| 10,771,389 B2 | 9/2020 | Hira et al. | |
| 10,966,135 B2* | 3/2021 | Svennebring | H04W 40/18 |
| 11,641,608 B2* | 5/2023 | Svennebring | H04W 36/32 |
| | | | 370/331 |
| 2002/0145981 A1 | 10/2002 | Klinker et al. | |
| 2002/0150229 A1 | 10/2002 | Riihinen et al. | |
| 2007/0283024 A1 | 12/2007 | Andrum et al. | |
| 2011/0302346 A1 | 12/2011 | Vahdat et al. | |
| 2013/0100816 A1 | 4/2013 | Bergamasco et al. | |
| 2014/0047252 A1 | 2/2014 | Ansari et al. | |
| 2014/0105044 A1 | 4/2014 | Baillargeon | |
| 2016/0277953 A1 | 9/2016 | Andersson et al. | |
| 2017/0295101 A1 | 10/2017 | Hira et al. | |
| 2018/0131617 A1 | 5/2018 | Hira | |
| 2019/0104075 A1 | 4/2019 | Li et al. | |
| 2022/0078863 A1* | 3/2022 | Gupta | G06F 9/54 |
| 2022/0103265 A1* | 3/2022 | Ghozlan | H04B 7/24 |
| 2022/0159501 A1* | 5/2022 | Chou | H04L 41/122 |
| 2022/0201777 A1* | 6/2022 | Teyeb | H04L 45/302 |

FOREIGN PATENT DOCUMENTS

| | | |
|---|---|---|
| CN | 107094090 A | 8/2017 |
| CN | 109314666 B | 2/2019 |
| GB | 2493710 A | 2/2013 |
| WO | 2017081518 A1 | 5/2017 |

OTHER PUBLICATIONS

Mohammad Alizadeh et al., "On the Data Path Performance of Leaf-Spine Datacenter Fabrics", IEEE 21st Annual Symposium on High-Performance Interconnects, 2013, pp. 71-74.

Jonathan Perry et al., "Fastpass: A Centralized "Zero-Queue" Datacenter Network", SIGCOMM, 2014, pp. 307-318, ACM.

Vimalkumar Jeyakumar et al., "EyeQ: Practical Netwok Performance Isolation at the Edge", 10th USENIX Symposium on Networked System Design and Implementation (NSDI'13), 2013, pp. 297-311, USENIX Association.

Lucian Popa et al., "FairCloud: Sharing the Network in Cloud Computing", HotNets-X, (New York, NY, USA), pp. 22:1-22:6, ACM, 2011.

Mohammad Alizadeh et al., "pFabric: Minimal Near-Optimal Datacenter Transport", SIGCOMM'13, Aug. 12-16, 2013, ACM.

Mosharaf Chowdhury et al., "Efficient Coflow Scheduling with Varys", SIGCOMM'14, Aug. 17-22, 2014, ACM.

Mohammad Al-Fares et al., "Hedera: Dynamic Flow Scheduling for Data Center Networks", NSDI 2010, (Berkeley, CA, USA), pp. 19-19, USENIX Association.

Theophilus Benson et al., "MiceroTE: Fine Grained Traffic Engineering for Data Centers", CoNEXT 2011, Dec. 6-9, 2011, ACM.

Jiaxin Cao et al., "Per-packet Load-balanced, Low-Latency Routing for Clos-based Data Center Networks", CoNEXT' 13, Dec. 9-12, 2013, pp. 49-60, ACM.

Srikanth Kandula et al., "Dynamic Load Balancing Without Packet Reordering", ACM SIGCOMM Computer Communication Review, Apr. 2007, pp. 53-62, No. 2, vol. 37.

Siddhartha Sen et al., "Scalable, Opimal Flow Routing in Datacenters via Local Link Balancing", CoNEXT'13, Dec. 9-12, 2013, ACM.

Mohammad Alizadeh et al., "CONGA: Distributed Congestion-Aware Load Balancing for Datacenters", SIGCOMM'14, Aug. 17-22, 2014, ACM.

Chi-Yao Hong et al., "Achieving High Utilization with Software-Driven Wan", SIGCOMM'13, Aug. 12-16, 2013, pp. 15-26, ACM.

Sushant Jain et al., "B4: Experience with a Globally-Deployed Software Defined WAN", SIGCOMM'13, Aug. 12-16, 2013, ACM.

Pat Bosshart et al., "Forwarding Metamorphosis: Fast Programmable Match-Action Processing in Hardware for SDN", SIGCOMM'13, Aug. 12-16, 2013, ACM.

International Search Report and Written Opinion of the International Searching Authority, International application No. PCT/US2017/027190, dated Jun. 9, 2017.

"Cavium and XPliant Introduce a Fully Programmable Switch Silicon Family Scaling to 3.2 Terabits per Second", News & Evnet, Retrieved on Aug. 24, 2017 from the Internet at <URL: http://tinyurl.com/nzbqtr3>.

Pat Bosshat et al., "P4: Programming Protocal-Independent Packet Processors", ACM SIGCOMM Computer Communication Review, Jul. 2014, pp. 88-95, No. 3, vol. 44.

Naga Katta et al., "HULA: Scalable Load Balancing Using Programmable Data Planes", SOSR'16, Mar. 14-15, 2016, ACM.

Radhika Niranjan Mysore et al., "PortLand: A Scalable Fault-Tolerant Layer 2 Data Center Network Fabric", SIGCOMM'09, Aug. 17-21, 2009, ACM.

"Cisco's Massively Scalable Data Center", Sep. 2015, Retrieved from <URL: http://www.cisco.com/c/dam/en/us/td/docs/solutions/Enterprise/Data_Center/MSDC/1-/MSDC_AAG_1.pdf>.

"BCM56850 Series: High-Capacity StrataXGS Trident II Et ernet Switc Series", Broadcom, Retrieved on Aug. 25, 2017 from the Internet at <URL: http://www.broadcom.com/products/Switching/Data-Center/BCM56850-Series>.

Shuihai Hu et al., "Explicit Path Control in Commodity Data Centers: Design and Applications", Proceedings of the 12th USENIX Symposium on Networked Systems Design and Implementation (NSDI'15), May 4-6, 2015, pp. 15-28.

Albert Greenberg et al., "VL2: A Scalable and Flexible Data Center Network", SIGCOMM'09, Aug. 17-21, 2009, ACM.

Chuanxiong Guo et al., "BCube: A High Performance, Server-centric Network Architecture for Modular Data Centers", SIGCOMM'09, Aug. 17-21, 2009, pp. 63-74, ACM.

Eleftheria Athanasopoulou et al., "Backpressure-based Packet-by-Packet Adaptive Routing in Communication Networks", IEEE/ACM Trans. Netw., vol. 21, pp. 244-257, Feb. 2013.

Baruch Awerbuch et al., "A Simple Local-Control Approximation Algorithm for Multicommodity Flow", Proceedings of the 34th IEEE Conf. on Found. of Computer Science, Oct. 1993.

"The P4 Language Specification", The P4 Language Consortium-Version 1.1.0, Nov. 18, 2015, pp. 109.

Sivasankar Radhakrishnan et al., "Dahu: Commodity Switches for Direct Connect Data Center Networks", ANCS, 2013, pp. 59-70, IEEE Press.

Anirudh Sivaraman et al., "Packet Transactions: A Programming Model for Data-Plane Algorithms at Hardware Speed", CoRR, 2015.

"Protocol-independent Switch Architecture," Jun. 4, 2015, Retrieved from <URL: http://schd.ws/hosted_files/p4workshop2015/c9/NickM-P4-Workshop-June-04-2015.pdf>.

"Members of the p4 consortium", Retrieved from <URL: http://p4.org/join-us/>.

Anirudh Sivaraman, "P4's Action-execution Semantics and Conditional Operators," Massachusetts Institute of Technology, Retrieved from the <URL: https://github.com/anirudhSK/p4-semantics/raw/master/p4-semantics.pdf>.

Mohammad Alizadeh et al., Data Center TCP (DCTCP), SIGCOMM'10, Aug. 30-Sep. 3, 2010, ACM.

Keqiang He et al., "Presto: Edge-based Load Balancing for Fast Datacenter Networks", SIGCOMM'15, Aug. 17-21, 2015, ACM.

Costin Raiciu et al., "Improving Datacenter Performance and Robustness with Multipath TCP", SIGCOMM'11, Aug. 15-19, 2011, pp. 266-277, ACM.

Wei Bai et al., "Information-Agnostic Flow Scheduling for Commodity Data Centers", NSDI'15, 2015, pp. 455-468, USENIX Association.

David Zats et al., "DeTail: Reducing the Flow Completion Time Tail in Datacenter Networks", SIGCOMM'12, Aug. 13-17, 2012, pp. 139-150, ACM.

Srikanth Kandula et al., "Walking the Tightrope: Responsive Yet Stable Traffic Engineering", SIGCOMM'05, Aug. 21-26, 2005, ACM.

Anwar Elwalid et al., "MATE: MPLS Adaptive Traffic Engineering", IEEE INFOCOM, 2001.

(56) References Cited

OTHER PUBLICATIONS

Nithin Michael et al., "HALO: Hop-by-Hop Adaptive Link-State Optimal Routing", IEEE/ACM Transactions on Networking, Dec. 2015, pp. 1862-1875, No. 6, vol. 23.
M. Mahalingam et al., "Virtual extensible Local Area Network (VXLAN): A Framework for Overlaying Virtualized Layer 2 Networks ovr Layer 3 Networks", Informational, IETF RFC 7348, Aug. 2014.
Nathan Farrington et al., "Data Center Switch Architecture in the Age of Merchant Silicon", 17th IEEE Symposium on High Performance Interconnects, 2009, pp. 93~102.
Zhiruo Cao et al., "Performance of Hasing-Based Schemes for Internet Load Balancing", IEEE INFOCOM, 2000, pp. 332-341.
Communication Pursuant to Article 94(3) EPC, Application No. 17 719 462.8-1216, dated Oct. 9, 2019.

\* cited by examiner

US 11,889,346 B2

QUALITY-AWARE USER DATA FORWARDING IN MOBILE COMMUNICATIONS SYSTEMS

BACKGROUND

Network function virtualization (NFV) technology plays an important role in the realization of next-generation mobile communications systems, including fifth generation (5G) systems. Using NFV, legacy network functions may be decoupled from purpose-built hardware, and instead deployed as virtualized network function (VNF) instances to facilitate independent scalability and deployment. In practice, VNF instances may be implemented using virtualized computing instances (e.g., virtual machines (VMs), containers, etc.) that are deployed in a Software-Defined Networking (SDN) environment, such as a Software-Defined Data Center (SDDC). Compared to hardware-based network functions, the deployment of cloud-native VNF instances in the SDN environment may present new challenges for mobile network operators, including packet forwarding, quality of service (QoS) handling, etc.

DETAILED DESCRIPTION

Figure 1A:
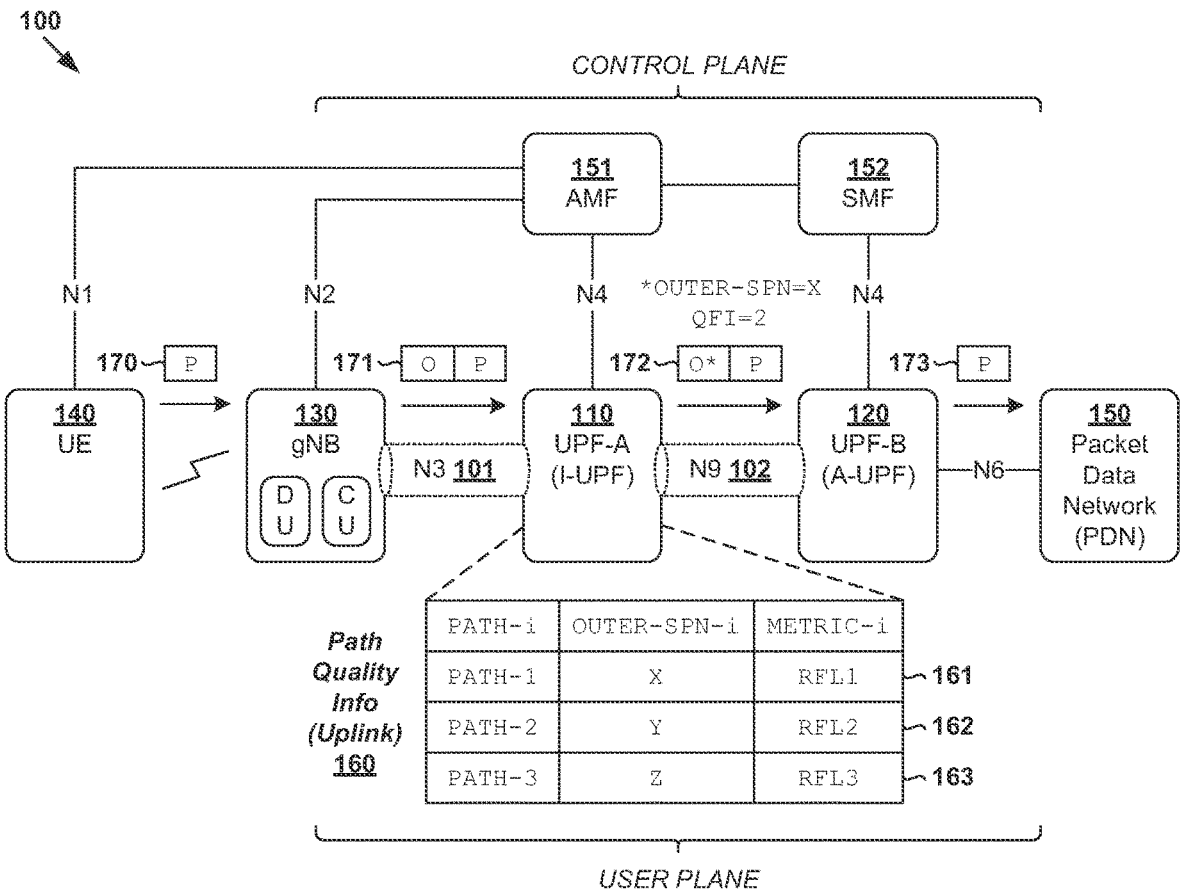
FIG. 1A is a schematic diagram illustrating a first example mobile communications system in which quality-aware user data forwarding may be performed for an uplink direction on an N9 interface.

According to examples of the present disclosure, quality-aware user data forwarding may be implemented in a mobile communications system to improve performance. One example may involve a first virtualized network function (VNF) instance (e.g., UPF-A 110 in FIG. 1A or gNB 130 in FIG. 1B) supported by a computer system (e.g., host-A 210A in FIG. 2) establishing a user plane tunnel with a second VNF instance (e.g., UPF-B 120 in FIGS. 1A-B) to provide user plane connectivity between a mobile user equipment and a packet data network (e.g., UE 140 and PDN 150 in FIGS. 1A-B). The first VNF instance may learn path quality information associated with multiple paths over the user plane tunnel. The path quality information (see 160 in FIG. 1A or 180 in FIG. 1B) may specify (a) a first mapping between a first outer source port number and a first quality metric associated with a first path, and (b) a second mapping between a second outer source port number and a second quality metric associated with a second path.

In response to receiving a packet that includes user data for forwarding in an uplink direction from the mobile user equipment towards the packet data network, or a downlink direction from the packet data network towards the mobile user equipment, the first VNF instance may select the first path over the second path based on at least the path quality information. An encapsulated packet may be generated and sent towards the second VNF instance over the user plane tunnel. The encapsulated packet may include the packet and an outer header specifying the first outer source port number in the first mapping such that the encapsulated packet is forwarded via the first path. Unlike conventional approaches that are agnostic to multiple physical paths in the underlay transport network, examples of the present disclosure may leverage these paths more intelligently during packet forwarding. This way, the underlay transport network may be utilized more efficiently for better performance.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

Figure 1B:
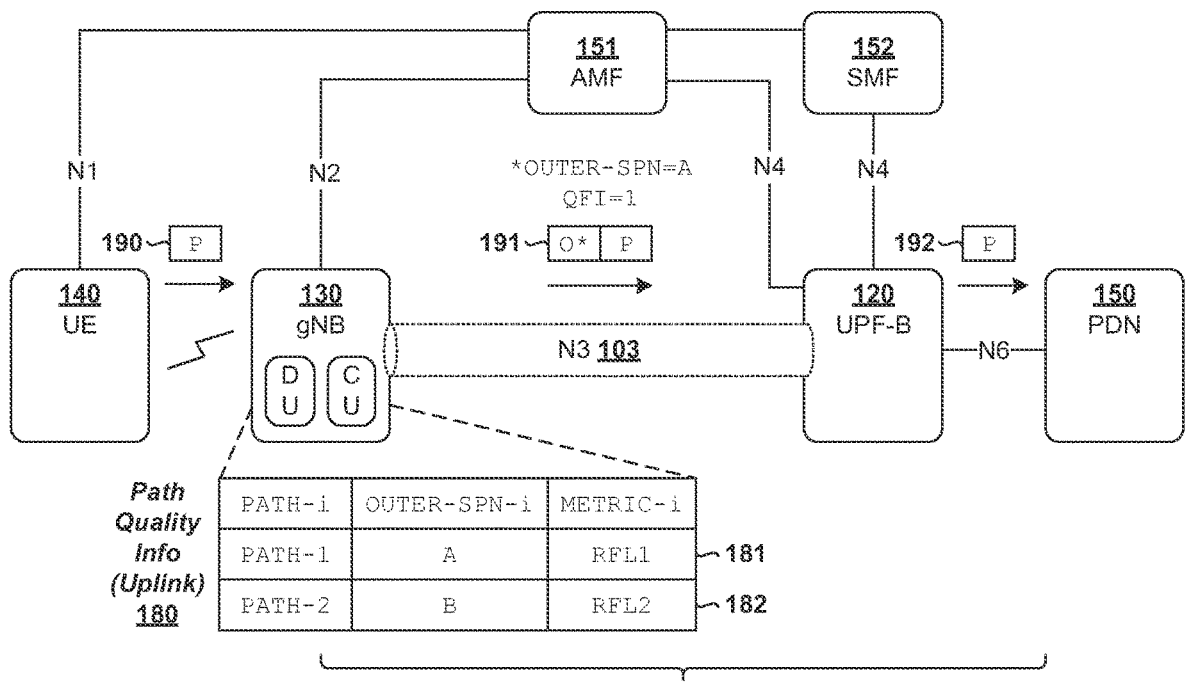
FIG. 1B is a schematic diagram illustrating a second example mobile communications system in which quality-aware user data forwarding may be performed for an uplink direction on an N3 interface.

FIG. 1A is a schematic diagram illustrating first example mobile communications system 100 in which quality-aware user data forwarding may be performed for an uplink direction on an N9 interface. FIG. 1B is a schematic diagram illustrating a second example mobile communications system in which quality-aware user data forwarding may be performed for an uplink direction on an N3 interface. Throughout the present disclosure, various examples will be discussed using fifth generation (5G) mobile communications system technology shown in FIGS. 1A-B. Example implementation details relating to 5G are described in various technical specifications (TSs) published by the Third Generation Partnership Project (3GPP). One example is the 3GPP TS 23.501 entitled "System architecture for the 5G system," which is incorporated herein by reference. Examples of the present disclosure may be applicable to future-generation mobile communications systems.

Referring first to the example in FIG. 1A, mobile communications system 100 in the form of a 5G system may include mobile user equipment (UE) 140 (one shown for simplicity) in wireless communication with a radio access network (RAN), which is known as a gNodeB (gNB) 130. For example, using 5G new radio (NR) radio interface based on software-defined radio, gNB 130 may handle radio communication with 5G-capable UE 140. 5G system 100 also includes a core network that employs network function virtualization (NFV) technology to virtualize legacy network functions into virtualized network function (VNF) instances. Example VNF instances include user plane function (UPF) instances 110-120, as well as access management function (AMF) 151 and session management function (SMF) 152.

Through control and user plane separation in 5G system 100, VNF instances on the user plane and control plane may be scaled up and/or down independently. In practice, UPF instances 110-120 may be deployed to provide user plane connectivity between UE 140 and packet data network (PDN) 150, such as the Internet, etc. As defined by 3GPP, UPF instance 110/120 serves as an interconnect point between the mobile infrastructure and data network 150. UPF instances 110-120 may be deployed to implement various functionalities, including packet forwarding (e.g., route traffic flows to a data network), packet inspection, policy rule enforcement (e.g., traffic steering), quality of service (QoS) handling for user plane, handling address resolution protocol (ARP) requests or IPv6 neighbor solicitation requests, high-latency communication, etc.

AMF 151 may be configured to control which UE 140 may access the core network and manage the mobility of UE 140 for session continuity (whenever possible) as they roam around. SMF 152 may keep track of packet data unit (PDU) sessions associated with (e.g., initiated by) UE 140 and ensure that their state information is synchronized among various VNF instances. SMF 152 may also convert policy and charging control (PCC) rules into QoS profile information and QoS rules to be implemented by UPF instances 110-120, gNB 130 and UE 140. 5G system 100 may include any alternative or additional VNF instance(s) that are not shown in FIG. 1 for simplicity, such as unified data management (UDM), authentication server function (AUSF), etc. As will be discussed below, any suitable number of UPF instance(s) may be deployed.

In the first deployment scenario in FIGS. 1A, first user plane tunnel 101 may be established between gNB 130 and UPF-A 110 over an N3 interface, and second user plane tunnel 102 between UPF-A 110 and UPF-B 120 over an N9 interface. In practice, when the N9 interface is configured, UPF-A 110 is known as an intermediate UPF (I-UPF), and UPF-B 120 as an anchor UPF (A-UPF). The N9 reference point for user plane traffic is generally applicable to a home routed (HR) scenario. In this case, the N9 interface may be intra-PLMN (i.e., public land mobile network) or inter-PLMN (in the case of HR deployment). Other interfaces include N1 (between UE 140 and AMF 151), N2 (between AMF 151 and gNB 130), N4 (between SMF 152 and UPF-A 110) and N6 (between UPF-B 120 and PDN 150). In SDN environment 200 in FIG. 2, UPF-A 110 and UPF-B 120 may be supported by respective computer systems in the form of host-A 210A and host-B 210B.

In a second deployment scenario in FIGS. 1B, intermediate function(s) provided by UPF-A 110 may not be desired and the N9 interface not configured. By extending the concept of NFV to gNB 130 through network disaggregation, gNB 130 may be disaggregated into multiple units, such as a distributed unit (DU or gNB-DU) and a control unit (CU or gNB-CU) according to the Open RAN (O-RAN) standard, etc. In this case, a user plane tunnel (see 103 in FIG. 1B) may be established between gNB 130 (e.g., gNB-CU) and UPF-B 120 over the N3 interface. Other interfaces include N1 (between UE 140 and AMF 151), N2 (between AMF 151 and gNB 130), N4 (between AMF/SMF 151/152 and UPF-B 120) and N6 (between UPF-B 120 and PDN 150). In SDN environment 200 in FIG. 2, DU/CU of gNB 130 and UPF-B 120 may be supported by respective computer systems in the form of host-A 210A and host-B 210B.

Physical Implementation View

Depending on the desired implementation, VNF instances may deployed on the cloud and implemented using cloud-native, virtualized computing instances, such as virtual machines (VMs), containers or containerized applications, etc. Some example VMs that are deployed in a software-defined networking (SDN) environment will be discussed in FIG. 2. UPF-A 110 may be implemented using a first VM (e.g., VM1 231) supported by a first computer system (host-A 210A), and UPF-B 120 using a second VM (e.g., VM2 232) supported by a second computer system (host-B 210B).

Figure 2:
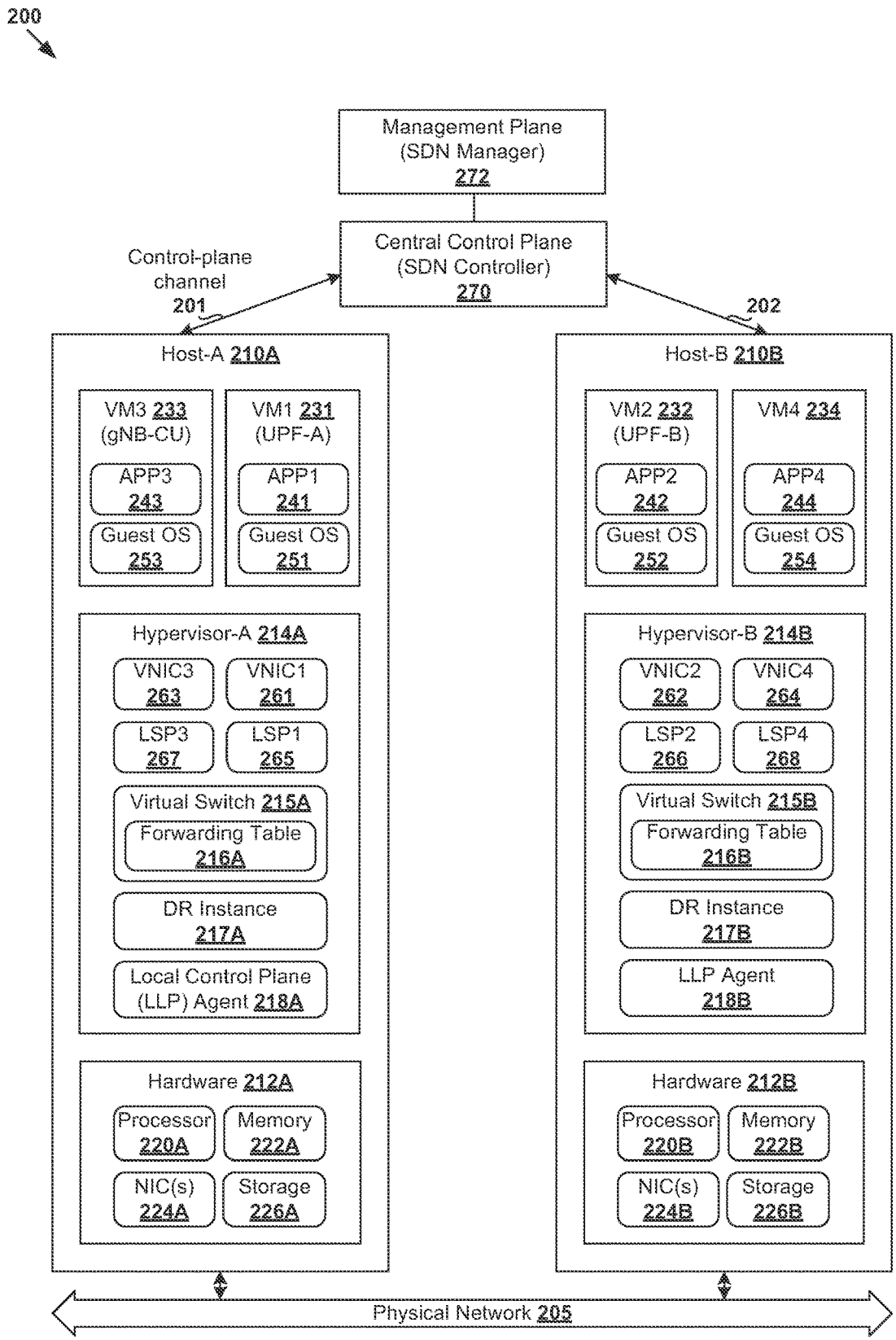
FIG. 2 is a schematic diagram illustrating an example physical view of hosts in a software-defined networking (SDN) environment.

In more detail, FIG. 2 is a schematic diagram illustrating an example physical view of hosts in SDN environment 200. It should be understood that, depending on the desired implementation, SDN environment 200 may include additional and/or alternative components than that shown in FIG. 1 and FIG. 2. In practice, SDN environment 200 may include any number of hosts (also known as "computer systems," "computing devices", "host computers", "host devices", "physical servers", "server systems", "transport nodes," etc.).

SDN environment 200 may include host-A 210A in FIG. 1 as well as other hosts, such as host 210B. Host 210A/210B may include suitable hardware 212A/212B and virtualization software (e.g., hypervisor-A 214A, hypervisor-B 214B) to support various VMs. For example, host-A 210A may support VM1 231 (e.g., acting as UPF-A 110) and VM3 233 (e.g., acting as a control unit of gNB 130), while VM2 232 (e.g., acting as UPF-B 120) and VM4 234 are supported by host-B 210B. Hardware 212A/212B includes suitable physical components, such as central processing unit(s) (CPU(s)) or processor(s) 220A/220B; memory 222A/222B; physical network interface controllers (PNICs) 224A/224B; and storage disk(s) 226A/226B, etc. Hosts 210A-B may be deployed at geographically-dispersed locations.

Hypervisor 214A/214B maintains a mapping between underlying hardware 212A/212B and virtual resources allocated to respective VMs. Virtual resources are allocated to respective VMs 231-234 to support a guest operating system (OS) and application(s); see 241-244, 251-254. The virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 231-234, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a virtualization software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" a network or Internet Protocol (IP) layer; and "layer-4" a transport layer (e.g., using Transmission Control Protocol (TCP), User Datagram Protocol (UDP), etc.), in the Open System Interconnection (OSI) model, although the concepts described herein may be used with other networking models.

SDN controller 270 and SDN manager 272 are example network management entities in SDN environment 200. One example of an SDN controller is the NSX controller component of VMware NSX® (available from VMware, Inc.) that operates on a central control plane. SDN controller 270 may be a member of a controller cluster (not shown for simplicity) that is configurable using SDN manager 272. Network management entity 270/272 may be implemented using physical machine(s), VM(s), or both. To send or receive control information, local control plane (LCP) agent 218A/218B on host 210A/210B may interact with SDN controller 270 via control-plane channel 201/202.

Hypervisor 214A/214B implements virtual switch 215A/215B and logical distributed router (DR) instance 217A/217B to handle egress packets from, and ingress packets to, VMs 231-234. In SDN environment 200, logical switches and logical DRs may be implemented in a distributed manner and can span multiple hosts. For example, a logical switch (LS) may be deployed to provide logical layer-2 connectivity (i.e., an overlay network) to VMs 231-234. A logical switch may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables (not shown) at respective DR instances 217A-B. Each routing table may include entries that collectively implement the respective logical DRs.

Packets may be received from, or sent to, each VM via an associated logical port. For example, logical switch ports 265-268 (labelled "LSP1" to "LSP4") are associated with respective VMs 231-234. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-B, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Quality-Aware User Data Forwarding

Compared to legacy systems that rely on hardware-based network functions, the use of NFV technology may present new challenges for mobile network operators. For example in FIG. 1, hosts 210A-B supporting VNF instances in SDN environment 200, and as well as physical network 205 connecting them, may be managed by third parties (e.g., cloud service provider). Due to the presence of a logical overlay transport network over user plane tunnel 101/102, the application core component is generally agnostic to the underlay transport network (e.g., physical network 205 in FIG. 2). In some cases, this may lead to poor performance due to inefficient user data forwarding.

According to examples of the present disclosure, a "quality-aware" approach may be implemented during user data forwarding by VNF instance(s) in mobile communications system 100 to achieve better performance, better reliability, and improved resiliency towards failure (e.g., poor path quality, outage, misconfiguration). In particular, path selection may be performed based on path quality information that is associated with multiple paths in an underlay transport network connecting a pair of VNF instances. Using the quality-aware approach, multiple paths (or physical links) in the underlay transport network over which a logical user plane tunnel is established may be used more intelligently.

As used herein, the term "user plane" in a mobile communications system may refer generally to a datapath between gNB 130 and PDN 150 via UPF-A 110 and/or UPF-B 120 to connect mobile UE 140 to PDN 150. The term "packet data unit (PDU) session" may refer generally to user plane connectivity (or association) between UE 140 and PDN 150. The term "user plane tunnel" may refer generally to a logical tunnel that is established between two VNF instances along the user plane to provide connectivity and mobility with PDN 150. The term "path" may refer generally to a physical link that is formed by physical network element(s) in an underlay transport network.

The term "VNF instance" may refer generally to a virtualized computing instance (e.g., VM or container) that is capable of implementing network function(s) of a mobile communications system. A VNF instance (e.g., UPF-A 110, UPF-B 120, gNB 130) that is configurable by a mobile network operator should be contrasted against a component implemented by virtualization software (e.g., hypervisor 214A/214B in FIG. 2), which is usually managed by a cloud provider. For example in FIG. 2, VM1 231 acting as UPF-A 110 may implement quality-aware user data forwarding according to examples of the present disclosure using APP1 241 (e.g., user space application) and/or guest OS 251.

Figure 3:
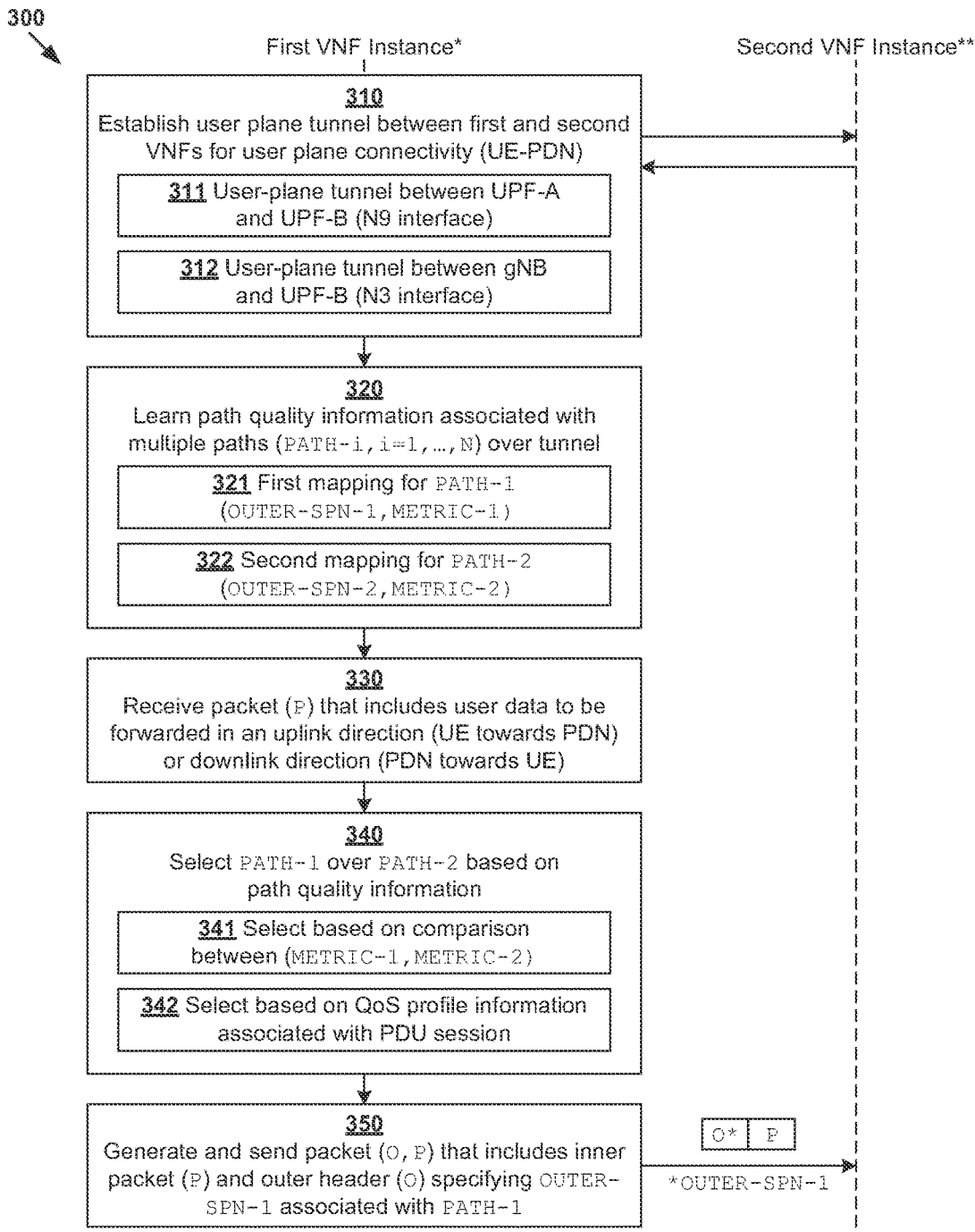
FIG. 3 is a flowchart of an example process for a computer system to perform quality-aware user data forwarding in a mobile communications system.

Some examples will be described using FIG. 3, which is a flowchart of example process 300 for a computer system to perform quality-aware user data forwarding in a mobile communications system. Example process 300 may include one or more operations, functions, or actions illustrated by one or more blocks, such as 310 to 350. Depending on the desired implementation, various blocks may be combined into fewer blocks, divided into additional blocks, and/or eliminated. FIG. 3 will be discussed using the example in FIGS. 1A-B.

At 310 in FIG. 3, a first VNF instance may establish user plane tunnel 102 with UPF-B 120 to provide user plane connectivity to PDN 150. In the example in FIGS. 1A-B, user plane tunnel 101/102 may be established any suitable user plane tunneling protocol, such as General Packet Radio Service (GPRS) Tunneling Protocol User Plane (GTP-U) that will be discussed in various examples below. In this case, user plane tunnel 102 may also be referred to as a GTP-U tunnel.

At 320 in FIG. 3, the first VNF instance may learn path quality information associated with multiple paths over user plane tunnel 102. Each path may be denoted as PATH-i, where index i=1, . . . , N. The path quality information may specify one or more mappings. Each mapping is between an outer source port number (OUTER-SPN-i) in an outer tunnel header and a path quality metric (e.g., METRIC-i) associated with each path (e.g., PATH-i). In practice, the path quality information may be learned, and relearned, dynamically over time to adapt to real-time characteristics in the underlay transport network.

At 330 in FIG. 3, the first VNF instance may receive a packet (P) that includes user data for forwarding in an uplink direction (i.e., from UE 140 towards PDN 150) or a downlink direction (i.e., from PDN 150 towards UE 140). At 340, the first VNF instance may select the first path over the second path based on the path quality information learned at block 320. At 350, the first VNF instance may generate and send an encapsulated packet towards the second VNF instance over user plane tunnel 102. The encapsulated packet may include the packet (P) and an outer header (O*) specifying the first outer source port number associated with the first path.

In one example, path selection at block 340 may be comparing the multiple paths based on their respective quality metrics to select the first path, such as the best quality path (e.g., lowest latency). In another example, path selection at block 340 may involve identifying QoS profile information associated with a PDU session associated with (e.g., initiated by) UE 140. In this case, the first path may be selected based on the QoS profile information and path quality information 160/180. The QoS profile information may include a QoS flow identifier (QFI) indicating that the packet is associated with one of the following: guaranteed bit rate (GBR) flow, delay-critical GBR flow and non-GBR flow. In this case, the first path may be selected in response to determination that the first quality metric satisfies one or more of the following QoS characteristics or requirements associated with the QFI: priority level, packet delay budget, packet error rate, averaging window and maximum data burst volume. Depending on the desired implementation, block 340 may be performed based on any suitable local policy or policies. One example policy is for enforcing priority among multiple packet flows. Another policy is for load distribution among the multiple paths when their respective quality metrics are substantially similar.

Example First and Second VNF Instances

Examples of the present disclosure may be implemented by any suitable "first VNF instance" and "second VNF instance." Throughout the present disclosure, the term "first VNF instance" may refer generally to any suitable VNF instance that is capable of perform quality-aware user data forwarding towards the "second VNF instance" by learning path quality information. Examples of the present disclosure may be implemented for user data forwarding in an uplink direction (i.e., towards PDN 150) and/or downlink direction (i.e., towards UE 140). Some example "first VNF instance" and "second VNF instance" are shown in FIG. 3.

(1) In a first example (see 301 in FIG. 3 and FIG. 1A), first VNF instance=UPF-A 110 and second VNF instance=UPF-B 120 for an uplink direction. In the example in FIG. 1A, UPF-A 110 may learn path quality information 160 associated with multiple paths over user plane tunnel 102. Based on path quality information 160, UPF-A 110 may generate and send encapsulated packet 172 towards UPF-B 120. Encapsulated packet 172 may include the inner packet (P) and an outer header (O*) specifying the first outer source port number (e.g., X) associated with a selected first path. In practice, path quality information 160 may include any suitable number (N) of mappings. See 160-163, 170-173 in FIG. 1A.

(2) In a second example (see 302 in FIG. 3), first VNF instance=gNB 130 and second VNF instance=UPF-A 110 for an uplink direction. For example in FIG. 1A, gNB 130 (e.g., gNB-CU) may learn path quality information associated with multiple paths over user plane tunnel 101 established with UPF-A 110. Based on the path quality information (not shown for simplicity), gNB 130 may perform path selection, as well as generate and send encapsulated packet (s) towards UPF-A 110. Each encapsulated packet may include an inner packet (P) and an outer header (O*) specifying an outer source port number associated with a selected path.

(3) In a third example (see 303 in FIG. 3 and FIG. 1B), first VNF instance=gNB 130 (e.g., gNB-CU) and second VNF instance=UPF-B 120 for an uplink direction when the N9 interface in FIG. 1A is not configured. In the example in FIG. 1B, gNB 130 may learn path quality information 180 associated with multiple paths over user plane tunnel 103 established with UPF-B 120. Based on path quality information 180, gNB 130 may generate and send encapsulated packet 191 towards UPF-B 120 over user plane tunnel 103. Encapsulated packet 191 may include a packet (P) and an outer header (O*) specifying an outer source port number (e.g., A) associated with a selected path. See 180-182 and 190-192 in FIG. 1B.

(4) In a fourth example (see 304 in FIG. 3 and FIG. 7A), first VNF instance=UPF-B 110 and second VNF instance=UPF-A 110 for a downlink direction. As will be discussed using FIG. 7A, UPF-B 120 may learn path quality information 720 associated with multiple paths over user plane tunnel 102 established with UPF-A 110. Based on path quality information 720, UPF-B 110 may perform quality-aware user data forwarding towards UPF-A 110, gNB 130 and UE 140. See 710-733 in FIG. 7A.

(5) In a fifth example (see 305 in FIG. 3 and FIG. 7A), first VNF instance=UPF-A 110 and second VNF instance=gNB 130 (e.g., gNB-CU) for a downlink direction. For example, UPF-A 110 may learn path quality information associated with multiple paths over user plane tunnel 101. Based on the path quality information (not shown in FIG. 7A for simplicity), UPF-A 110 may generate and send encapsulated packet(s) towards gNB 130 over user plane tunnel 101. Each encapsulated packet may include a packet (P) and an outer header (O*) specifying an outer source port number associated with a selected path.

(6) In a sixth example (see 306 in FIG. 3 and FIG. 7B), first VNF instance=UPF-B 120 and second VNF instance=gNB 130 (e.g., gNB-CU) for a downlink direction. In the example in FIG. 7B, UPF-B 120 may learn path quality information 750 associated with multiple paths over user plane tunnel 103 established with gNB 130. Based on path quality information 750, UPF-B 120 may generate and send encapsulated packet 191 towards UPF-B 120 over user plane tunnel 103. Encapsulated packet 191 may include a packet (P) and an outer header (O*) specifying an outer source port number (e.g., C) associated with a selected path. See 750-752 and 760-762 in FIG. 7B.

Using examples of the present disclosure, VNF instance(s) in mobile communications system 100 may learn path quality information dynamically and configure outer header (O*) to influence an underlay physical transport network to forward the encapsulated packet via a particular path. Unlike conventional approach, this reduces the risk of forwarding packets with high QoS requirements via a poor quality path (e.g., high latency for delay-critical GBR flow), which is sub-optimal and affect performance. In practice, any suitable quality metric(s) may be measured, such as unidirectional latency (e.g., relative latency factor), two-way latency, path availability (e.g., UP or DOWN), packet loss, jitter, or any combination thereof.

In practice, 5G is positioned to enhance mobile broadband experiences and support different industry verticals, such as augmented reality (AR), virtual reality (VR), automotive, energy, public safety, and Internet of Things (IOT). This sets very challenging and demanding QoS requirements such as latency and throughput for better performance and user experience. Examples of the present disclosure may be implemented to support a myriad of applications that require different levels of performance guarantees from the underlay transport network over which a user plane tunnel is established. Over time, packets with different QoS requirements may be load balanced among multiple paths in a self-adaptive and dynamic manner. Various examples will be discussed below using FIGS. 4-7B.

Intelligent Probing

Figure 4:
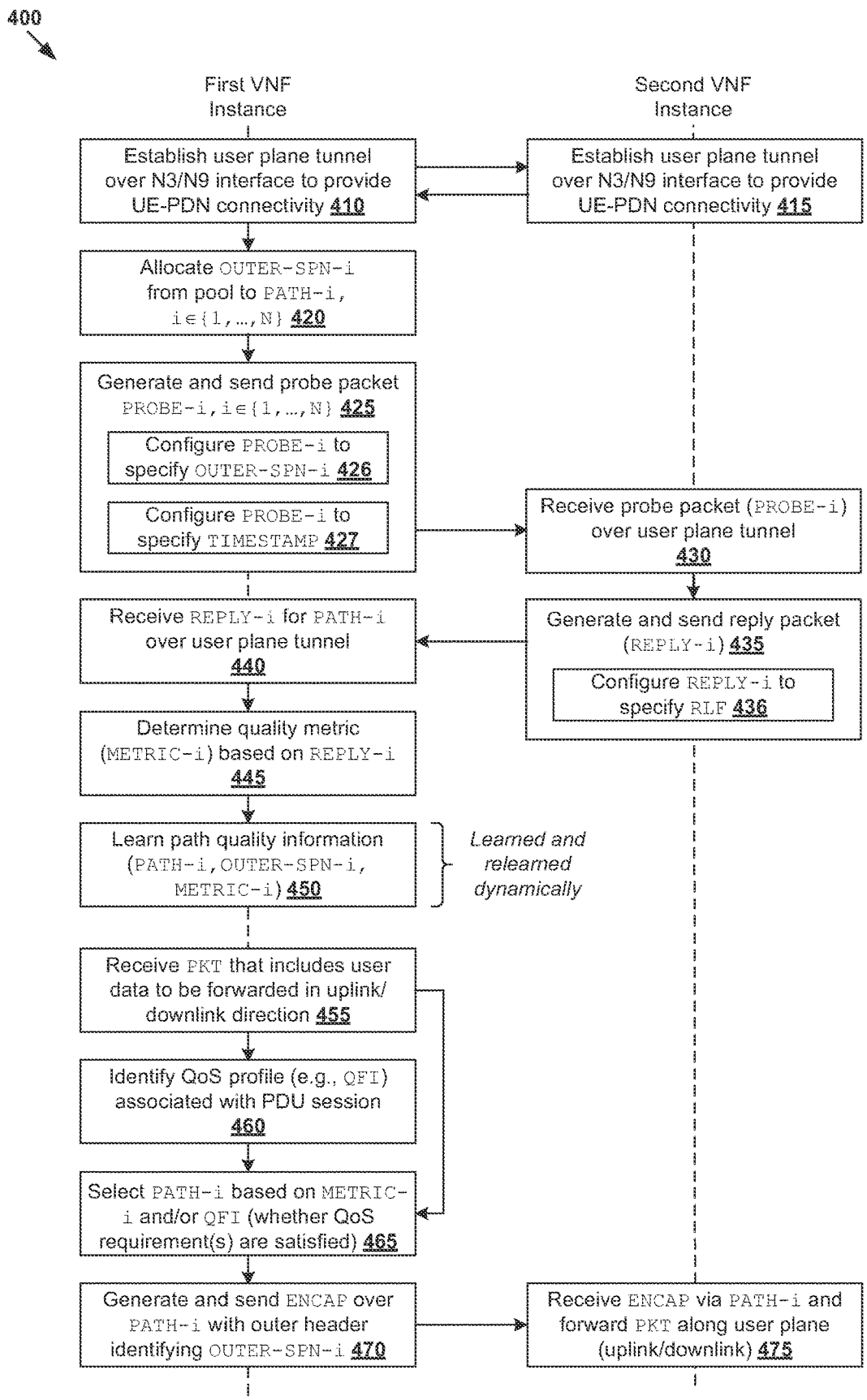
FIG. 4 is a flowchart of an example detailed process for a computer system to perform quality-aware user data forwarding in a mobile communications system.

FIG. 4 is a flowchart of example detailed process 400 for quality-aware user data forwarding in a mobile communications system. Example process 400 may include one or more operations, functions, or actions illustrated by one or more blocks, such as 410 to 475. Depending on the desired implementation, various blocks may be combined into fewer blocks, divided into additional blocks, and/or eliminated. Some examples will be described using FIG. 5, which is a schematic diagram illustrating first example 500 quality-aware user data forwarding for an uplink direction in the mobile communications system in FIG. 1B. Note that the example in FIG. 4 may be implemented for any suitable pair of "first VNF instance" and "second VNF instance," some examples of which are shown in FIG. 3.

(a) User Plane Tunnels

At 410 and 415 in FIG. 4, user plane tunnel(s) may be established using any suitable user plane tunneling protocol, such as GTP-U mentioned above, etc. Implementation details relating to GTP-U are described in the 3GPP TS 29.281 release 16.0.0 entitled "GPRS Tunneling Protocol for User Plane (GTPv1-U)," which is incorporated herein by reference. In practice, any alternative user plane tunneling protocol may be used, such as segment routing using Segment Routing over Internet Protocol version 6 (SRv6) or Network Service Header (NSH), Information Centric Networking (ICN) protocol, etc.

Figure 5:
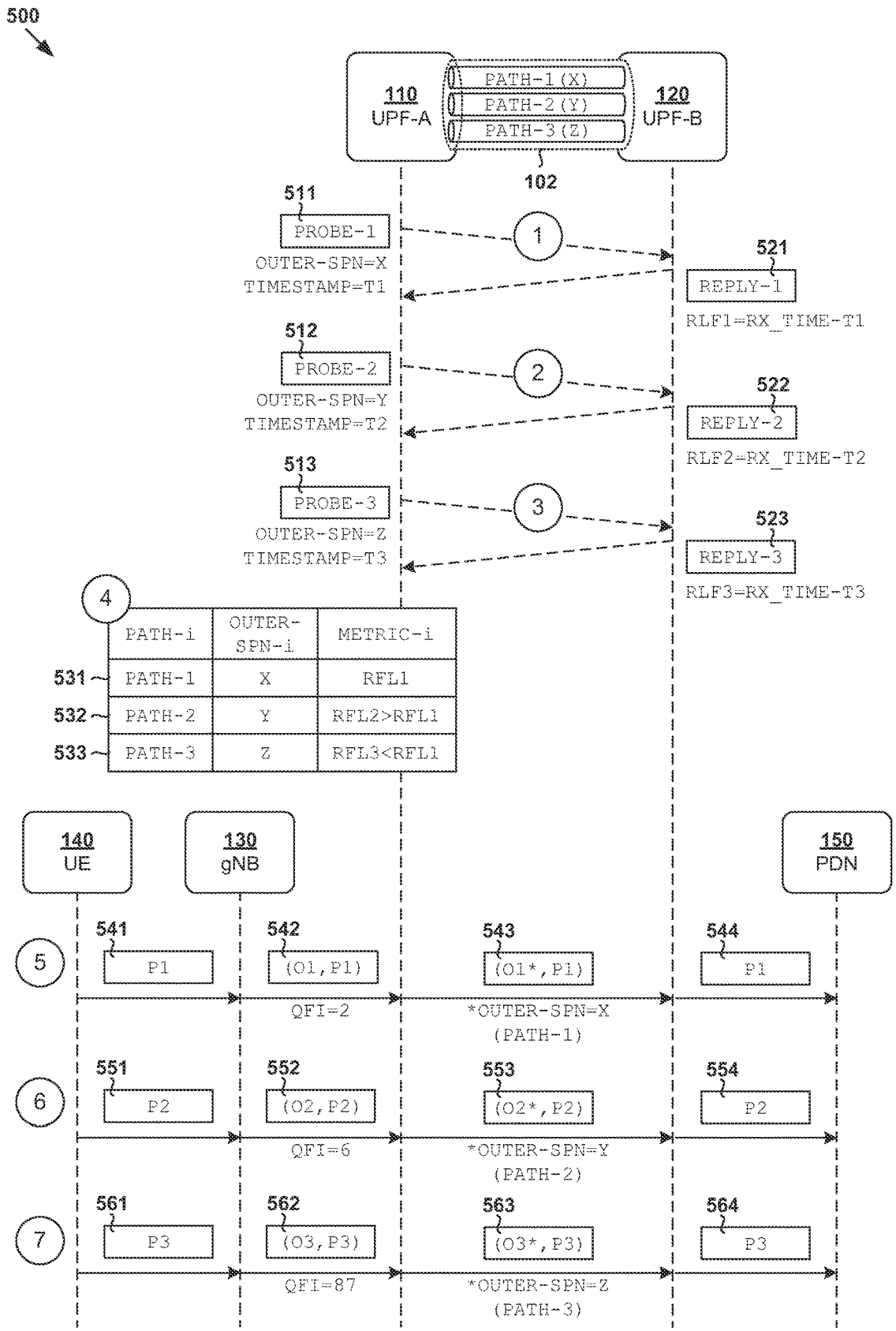
FIG. 5 is a schematic diagram illustrating a first example of quality-aware user data forwarding for an uplink direction in the mobile communications system in FIG. 1A.

In the example in FIG. 5, GTP-U tunnel 102 may be established between UPF-A 110 and UPF-B 120 over the N9 interface for packet forwarding. Another GTP-U tunnel 101 (shown in FIG. 1A) may be established between gNB 130 and UPF-A 110 over the N3 interface. GTP-U tunnels 101-102 are established to provide user plane connectivity such that UE 140 may access data network 150 as desired.

Each data packet that is sent over GTP-U tunnel 101/102 is encapsulated with an outer GTP-U header specifying OUTER_SIP=outer source IP address associated with a source GTP-U tunnel endpoint (e.g., UPF-A 110), OUTER_DIP=outer destination IP address associated with a destination GTP-U tunnel endpoint (e.g., UPF-B 120), OUTER_SPN=outer source UDP port number, OUTER_DPN=outer destination UDP port number, LEN=UDP length, CHK=UDP checksum, etc.

(b) Probe Packets

At 420 and 425 in FIG. 4, UPF-A 110 may initiate intelligent probing by generating and forwarding probe packets towards UPF-B 120 via multiple (N) physical paths in the underlay transport network over user plane tunnel 102 (i.e., N9 interface) is established. The probe packets are sent to cause UPF-B 120 to respond with reply packets. Intelligent probing is performed to learn quality metric(s) associated with each of the multiple (N) paths. In practice, path management messages in the form of GTP-U echo messages may be used, such as echo request messages (i.e., probe packets) and echo reply messages (i.e., reply packets). Conventionally, these path management messages are usually used for monitoring reachability between tunnel endpoint peers. To measure path quality measurement, these messages may be extended, such as to carry a timestamp and quality metric(s) in FIG. 5.

To learn quality metric(s) associated with multiple (N) paths over user plane tunnel 102, each path (PATH-i, where i∈1, . . . , N) may be allocated with a specific outer UDP source port number (OUTER_SPN-i). In the example in FIG. 5, there are three (N=3) paths in the underlay transport network connecting UPF-A 110 and UPF-B 120. In this case, OUTER_SPN-1=X may be associated with a first path (PATH-1), OUTER_SPN-2=Y with a second path (PATH-2), and OUTER_SPN-3=Z with a third path (PATH-3). Through dynamic UDP source port allocation, different outer source port numbers may be selected to influence packet forwarding via different paths in the underlay transport network. This should be contrasted against conventional approaches that are agnostic to the underlay transport network without learning any path quality information.

In practice, UPF-A 110 may maintain a pool of outer source UDP port numbers to be used as a source port entropy. Depending on the desired implementation, the selection of specific outer source port numbers for different paths may be random, etc. In some cases, however, it would be difficult to enforce QoS if a GTP-U flow with high QoS requirements is forwarded via a path with poor quality metric(s). Balancing packets as per static split ratio may yield suboptimal results in terms of end-to-end goodput. Instead, the split ratio may be continuously adapted to the current performance of the available paths.

Each probe packet (PROBE-i) may specify OUTER_SPN-i associated with a path (PATH-i). In the example in FIG. 5, first probe packet (PROBE-1) 511 may be generated and sent to learn first quality metric(s) associated with PATH-1. First probe packet 511 may include a header specifying (OUTER_SIP=IP-UPF-A, OUTER_DIP=IP-UPF-B, OUTER_SPN=X). To measure unidirectional latency, first probe packet 511 may include a timestamp (i.e., TIMESTAMP=T1) indicating a transmit (TX) time at UPF-A 110. See 426-427 in FIG. 4.

Second probe packet (PROBE-2) 512 may be generated and sent to learn second quality metric(s) associated with a second path (PATH-2). Second probe packet 512 may include a header specifying (OUTER_SIP=IP-UPF-A, OUTER_DIP=IP-UPF-B) and a different OUTER_SPN=Y. To measure quality metric=unidirectional latency, a timestamp value (TIMESTAMP=T2) indicating a TX time at UPF-A 110 may be included in second probe packet 512.

Similarly, third probe packet (PROBE-3) 513 may be generated and sent to learn third quality metric(s) associated with a third path (PATH-3). Third probe packet 513 may include a header specifying (OUTER_SIP=IP-UPF-A, OUTER_DIP=IP-UPF-B) and a different OUTER_SPN=Z. To measure quality metric=unidirectional latency, third probe packet 513 may include a timestamp value (TIMESTAMP=T3) indicating a TX time at UPF-A 110.

(c) Reply Packets

At 430, 435 and 436 in FIG. 4, in response to receiving a probe packet, UPF-B 120 may generate and send a reply packet to UPF-A 110. For example, to measure quality metric=unidirectional latency, the reply packet may include a relative latency factor calculated by UPF-B 120. The relative latency factor is the difference between (1) a current timestamp indicating a receive (RX) time at UPF-B 120 and (2) the timestamp value indicating a TX time in the probe packet.

Referring to the example in FIG. 5 again, reply packets 521-523 are addressed from UPF-B 120 to UPF-A 110. First reply packet (REPLY-1) 521 may include a first relative latency factor value (RLF1), which is the difference between (1) a first RX time at UPF-B 120 and (2) TIMESTAMP=T1 at UPF-A 110. Second reply packet (REPLY-2) 522 may include a second relative latency factor value (RLF2), which is the difference between a second RX time at UPF-B 120 and TIMESTAMP=T2. Similarly, third reply packet (REPLY-3) 523 may include a third relative latency factor value (RLF3), which is the difference between a third RX time at UPF-B 120 and TIMESTAMP=T3 at UPF-A 110.

Using examples of the present disclosure, real-time path quality information associated with multiple paths may be measured by extending conventional GTP-U echo request and reply messages to measure quality metric(s). In the example in FIG. 5, an echo request message (i.e., probe packet) may include an additional field to store a timestamp value (e.g., 8 octets) as a private extension. Similarly, an echo reply message (i.e., reply packet) may include an additional field to store a relative latency factor value (e.g., 4 octets) as a private extension.

(d) Path Quality Information

At 440, 445 and 450 in FIG. 4, in response to receiving a reply packet, UPF-A 110 may learn path quality information that includes a mapping between (a) an outer source port number allocated to a path, and (b) quality metric(s) associated with the path. For example in FIG. 5, based on first reply packet 521, UPF-A 110 may learn first mapping=(OUTER_SPN-1=X, METRIC-1=RLF1) associated with PATH-1. Based on second reply packet 522, UPF-A 110 may learn second mapping=(OUTER_SPN-2=Y, METRIC-2=RLF2) associated with PATH-2. Based on third reply packet 523, UPF-A 110 may learn third mapping=(OUTER_SPN-3=Z, METRIC-3=RLF3) associated with PATH-3. See 531-533 in FIG. 5.

Since the relative absolute value is used for calculating the unidirectional latency of a path, there is no need to have network time protocol (NTP) synchronization between UPF-A 110 and UPF-B 120. In practice, there are also ways to measure unidirectional latency of a network path using external tools such as one-way active measurement protocol (OWAMP). However, these tools generally require NTP clock synchronization on both GTP-U peers. Since UPF-A 110 and UPF-B 120 are cloud-native VNF instances, NTP clock synchronization is challenging to implement.

Although the example in FIG. 5 involves the measurement of unidirectional latency from UPF-A 110 to UPF-B 120, it should be understood that any alternative and/or additional metric(s) may be learned. Examples include two-way latency, path availability (e.g., UP or DOWN), packet loss, jitter, etc. Here, two-way latency measures the round-trip time (RTT) required to transmit a packet from the source to the destination, then back to the source. Path availability may be measured based on whether a reply packet is received (i.e., UP) or not (i.e., DOWN). Packet loss may be measured based on the number of packets lost per a fixed number (e.g., 100) sent. In this case, block 425 may involve tagging each probe packet with a monotonically increasing index or sequence number for packet loss detection. Jitter may be measured based on the variance in latency over time.

Examples of the present disclosure may be extended to calculate different MTU sizes of the paths in the underlay transport network. For example, this may involve generating and forwarding probe packets of a predetermined size to determine whether a fragmentation required error message is received.

Quality-Aware User Data Forwarding (Uplink Over N9 Interface)

(a) PDU Session and QFI

At 455 in FIG. 4, UPF-A 110 may receive a packet associated with a PDU session associated with (e.g., initiated by) UE 140 to connect with PDN 150. The packet may be received by UPF-A 110 via an air interface between UE 140 and gNB 130, and user plane tunnel 101 between gNB 130 and UPF-A 110. In practice, a PDU session may refer to an association between UE 140 and PDN 150 that provides a PDU connectivity service. In 5G system, a PDU session may be based on IPv4, IPv6, IPv4v6, Ethernet or unstructured.

During the establishment of a PDU session, the control plane (e.g., AMF 151 and/or SMF 152) may send various configuration parameter(s) to UE 140, gNB 130, UPF-A 110 and UPF-B 120. For example, QoS profile information associated with the PDU session may be sent from AMF 151 to gNB 130, and service data flow (SDF) template information from SMF 152 to UPF 110/120. The QoS profile information may include a QFI associated with the PDU session. The QFI may be configured to indicate whether the PDU session is associated with one of the following QoS flows (known as resource type): (1) GBR flow, (2) non-GBR flow that does not require guaranteed flow bit rate, and (3) delay-critical GBR for mission-critical flow. In 5G system 100, QoS is generally enforced at the QoS flow level. Each QFI may be associated with a set of QoS characteristics or requirements, such as priority level, packet delay budget, packet error rate, default averaging window (e.g., for GBR and delay-critical GBR), maximum data burst volume (e.g., for delay-critical GBR), any combination thereof, etc.

(b) Path Selection Based on Path Quality Information

At 460 and 465 in FIG. 4, in response to receiving a packet from UE 140 via gNB 130, UPF-A 110 may perform path selection based on the path quality information learned at block 450. At 470, UPF-A 110 may generate and send an encapsulated packet that includes the packet and an outer header towards UPF-B 120 via the selected path. The outer header may be configured to include an outer source port number (OUTER_SPN-i) associated with the selected path (PATH-i), thereby influencing the underlay transport network to forward the encapsulated packet towards UPF-B 120 via the selected path.

Depending on the desired implementation, path selection may be performed based on the quality metric (METRIC-i) associated with each path (PATH-i) and/or QoS profile information associated with the PDU session associated with UE 140. In one example, the best quality path (e.g., lowest unidirectional latency) may be selected by comparing paths (PATH-i) based on their respective quality metrics (METRIC-i) for i=1, . . . , N. In another example, path selection may be performed based on QoS profile information (e.g., QFI) associated with the PDU session. This involves determining whether the quality metric (METRIC-i) associated with a path (PATH-i) satisfies QoS requirement(s) associated with the QFI.

Three examples with different QFIs are shown FIG. 5. In a first example (see 531, 541-544 in FIG. 5), UPF-A 110 may receive a first encapsulated packet (O1, P1) from gNB 130. Based on QoS profile information from AMF 151 and/or SMF 152, gNB 130 may configure the outer header (O1) to specify QFI=2 associated with a PDU session initiated by UE 140. Here, QFI=2 indicates that inner packet (P1) 541 belongs to a GBR flow for conversational video. In response, UPF-A 110 may select PATH-1 by comparing quality metrics (e.g., RLF2>RLF1>RLF3) associated with respective paths. Alternatively or additionally, PATH-1 may be selected based on determination that quality metric=RLF1 satisfies the QoS requirement(s) associated with QFI=2. Next, UPF-A 110 may generate and send an encapsulated packet (O1*, P1) via PATH-1 towards UPF-B 120. The outer header (O1*) may specify OUTER_SPN=X based on mapping (PATH-1, X) to influence physical network element(s) in the underlay transport network to forward the encapsulated packet via PATH-1. At UPF-B 120, decapsulation is performed and the packet (P1) originating from UE 140 is forwarded towards PDN 150. See also 475 in FIG. 4.

In a second example (see 532, 551-554 in FIG. 5), UPF-A 110 may receive a second encapsulated packet (O2, P2) from gNB 130. Based on QoS profile information from AMF 151 and/or SMF 152, gNB 130 may configure the outer header (O2) to specify QFI=6 associated with a PDU session initiated by UE 140. Here, QFI=6 indicates that the inner packet (P2) 551 belongs to a non-GBR flow, such as for email access. In response, UPF-A 110 may select PATH-2 by comparing the quality metrics (e.g., RLF2>RLF1>RLF3). Alternatively or additionally, PATH-2 may be selected based on determination that the quality metric=RLF2 is sufficient to satisfy the QoS requirement(s) associated with QFI=6. Next, UPF-A 110 may generate and send an encapsulated packet (O2*, P2) via PATH-2 towards UPF-B 120. The outer header (O2*) may specify OUTER_SPN=Y based on mapping (PATH-2, Y) to influence physical network element(s) in the underlay transport network to forward the encapsulated packet via PATH-2. At UPF-B 120, decapsulation is performed and the packet (P2) originating from UE 140 is forwarded towards PDN 150.

In a third example (see 533, 561-564 in FIG. 5), UPF-A 110 may receive a third encapsulated packet (O3, P3) from gNB 130. In this case, the outer header (O3) may specify QFI=87 to indicate that the inner packet (P3) 561 belongs to a delay-critical GBR flow, such as for real-time motion tracking. In response, UPF-A 110 may select PATH-3 by comparing the quality metrics (e.g., RLF2>RLF1>RLF3).

Alternatively or additionally, PATH-3 may be selected based on determination that the quality metric=RLF3 satisfies QFI=87, which has more stringent QoS requirement(s) compared with QFI=2 (i.e., GBR) and QFI=6 (i.e., non-GBR). Next, UPF-A 110 may generate and send an encapsulated packet (O3*, P3) via PATH-3 towards UPF-B 120. The outer header (O3*) may specify OUTER_SPN=Z based on mapping (PATH-3, Z) to influence physical network element(s) in the underlay transport network to forward the encapsulated packet via PATH-3. At UPF-B 120, decapsulation is performed and the packet (P3) originating from UE 140 is forwarded towards PDN 150.

Using examples of the present disclosure, a "quality-aware" approach may be implemented for packet forwarding based on path quality information and/or QoS profile information associated with a PDU session. In the example in FIG. 5, PATH-3 with the lowest latency may be selected for a delay-critical GBR flow. Although PATH-2 has the highest latency, it is determined to be sufficient to meet the QoS requirement(s) of a non-GBR flow. This improves the likelihood of meeting the different QoS requirements of various PDU sessions associated with the same UE 140, or multiple UE to improve performance and user satisfaction.

Depending on the desired implementation, quality-aware user data forwarding may be implemented over both first user plane tunnel 101 (i.e., between gNB 130 and UPF-A 110) and second user plane tunnel 102 (i.e., between UPF-A 110 and UPF-B 120) in FIG. 1A and FIG. 5. In this case, both gNB 130 (e.g., gNB-CU) and UPF-A 110 may act as a "first VNF instance" to perform blocks 410, 420-425, 440-470 in the example in FIG. 4, the details of which are not repeated here for simplicity. See also 301-302 in FIG. 3.

Quality-Aware User Data Forwarding (Uplink Over N3 Interface)

In another deployment scenario, the N9 interface between UPF-A 110 (i.e., I-UPF) and UPF-B 120 (i.e., A-UPF) is not configured. In this case, quality-aware user data forwarding may be implemented over user plane tunnel 103 (i.e., N3 interface) between gNB 130 and UPF-B 120. Some examples will be explained using FIG. 6, which is a schematic diagram illustrating second example 600 of quality-aware user data forwarding for an uplink direction in the mobile communications system in FIG. 1B. In this example, RAN virtualization may be implemented in 5G system 100 to disaggregate gNB 130 into multiple units, such as according to the O-RAN standard, etc. Through separation of hardware and software, a baseband unit may be decomposed into multiple functional units, including gNB-DU 601, gNB-CU 602, and a radio unit (RU) to interact with UE 140 (RU not shown for simplicity).

In practice, O-RAN provides various advantages, including reducing capital expenditure (CAPEX) associated with purpose-build and proprietary hardware, dynamic allocation of resources through virtualization, network functions in the form of application programming interfaces (APIs), real-time optimization, etc. In practice, both DU 601 and CU 602 are software-defined VNF instances that are constructed using NFV technology. They possess cloud-native capabilities and may be deployed on any suitable public or private cloud, such as SDN environment 200 in FIG. 2. Depending on the desired implementation, CU 602 may be further decoupled into distinct control plane (CU-CP) and user plane (CU-UP) functions (not shown for simplicity).

Figure 6:
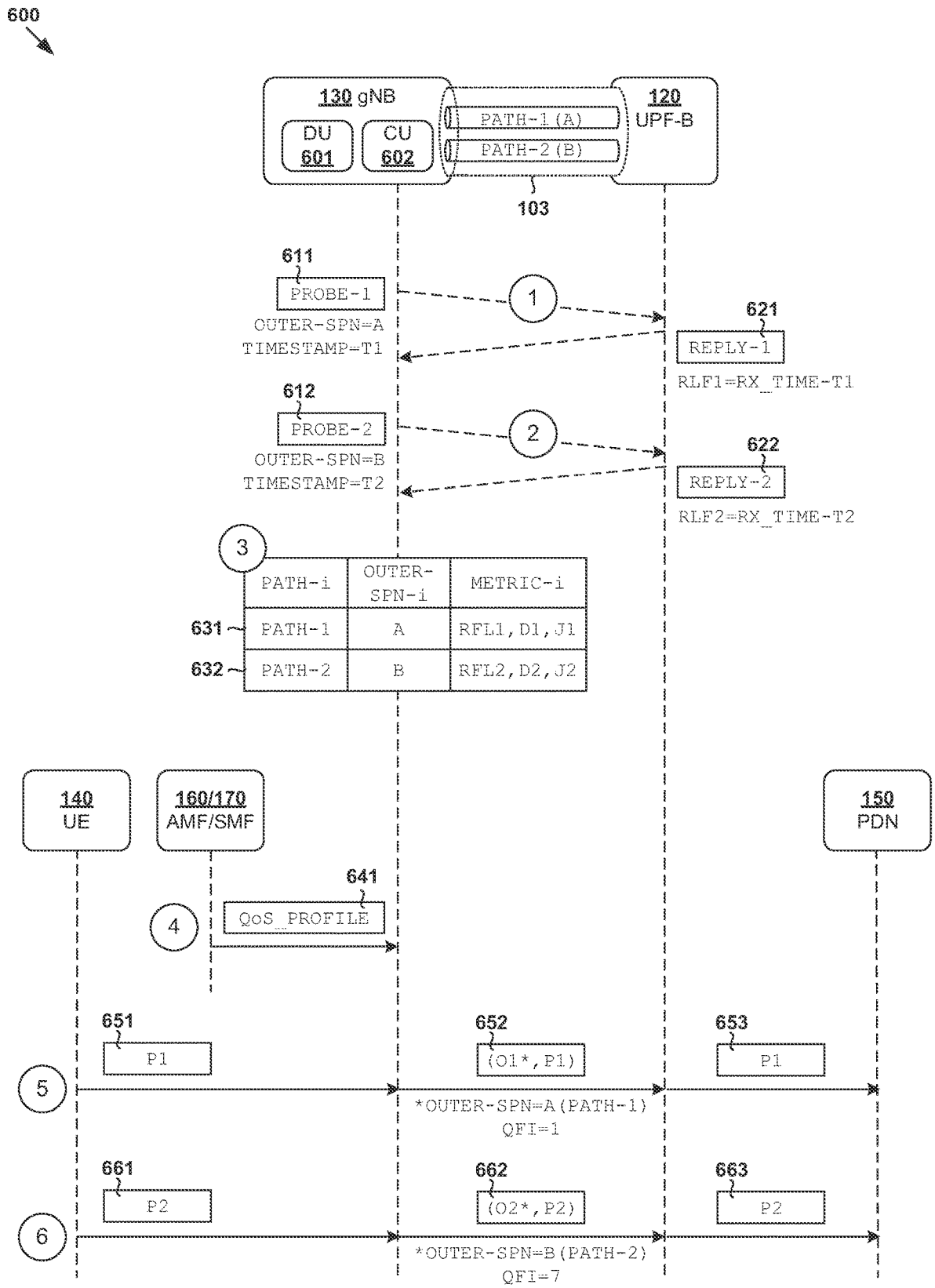
FIG. 6 is a schematic diagram illustrating a second example of quality-aware user data forwarding for an uplink direction in the mobile communications system in FIG. 1B.

According to examples of the present disclosure, gNB 130 (particularly DU 601 or CU 602) may perform quality-aware user data forwarding in 5G system 100 according to the example in FIG. 4. Referring also to FIG. 6, some examples will be discussed using N=2 paths in the underlay transport network connecting gNB 130 and UPF-B 120.

(a) Intelligent Probing

At 611 in FIG. 6, a first probe packet (PROBE-1) may be generated and sent to learn first quality metric(s) associated with a first path (PATH-1) of user plane tunnel 103 between gNB 130 and UPF-B 120. The probe packet may specify OUTER_SPN=A allocated to PATH-1 from a pool of UDP port numbers. At 621, UPF-B 120 may respond with a first reply packet. At 632, gNB 130 may learn a first mapping between OUTER_SPN=B and METRIC=(RLF1, L1, J1) for PATH-1. Here, RLF1=unidirectional latency learned from the reply packet from UPF-B 120, while both L1=packet loss rate and J1=jitter rate may be measured by gNB 130.

At 612 in FIG. 6, a second probe packet (PROBE-2) may be generated and sent to learn second quality metric(s) associated with a second path (PATH-2) of user plane tunnel 103 that is established between gNB 130 and UPF-B 120. The probe packet may specify OUTER_SPN=B allocated to PATH-2 from a pool of port numbers. At 622, UPF-B 120 may respond with a second reply packet. At 632, gNB 130 may learn a second mapping between OUTER_SPN=A and METRIC=(RLF2, L2, J2) for PATH-2. Here, RLF2=unidirectional latency specified in the reply packet from UPF-B 120, while both L2=packet loss and J2=jitter rate may be measured by gNB 130.

(b) Path Selection

At 641 in FIG. 6, gNB 130 may receive control information from the control plane (AMF 151 and/or SMF 152), including QoS profile information associated with PDU session(s) initiated by UE 140. As described above, the QoS profile information may include a QFI indicating whether a PDU session is associated with (1) a GBR flow, (2) a non-GBR flow or (3) a delay-critical GBR flow. The QFI also indicates the minimum QoS characteristics or requirements associated with each QoS flow.

At 651 in FIG. 6, gNB 130 (e.g., radio unit) may receive a first packet (P1) associated with a first PDU session initiated by UE 140. Based on QoS profile information received from the control plane, gNB 130 (e.g., DU 601 or CU 602) may identify QFI=1 associated with the PDU session. Here, QFI=1 indicates that the first packet belongs to a GBR flow for conversational voice with a first set of QoS requirements, such as priority level=20, packet delay budget=100 ms, etc.

In response, gNB 130 may select PATH-1 by comparing (RLF1, L1, J1) with (RLF2, L2, J2) to select the best quality path. Alternatively or additionally, PATH-1 may be selected based on determination that (RLF1, L1, J1) satisfies the QoS requirements associated with QFI=1. Next, gNB 130 may generate and send an encapsulated packet (O1*, P1) over user plane tunnel 103 (N3 interface). The outer header (O1*) may specify OUTER_SPN=A to influence the underlay transport network to forward the packet towards UPF-B 120 and PDN 150 via PATH-1. See 652-653 in FIG. 6.

At 661 in FIG. 6, gNB 130 may receive a second packet (P2) associated with a second PDU session initiated by UE 140. Based on QoS profile information received from the control plane, gNB 130 may identify QFI=7 associated with the PDU session. Here, QFI=7 indicates that the second packet belongs to a non-GBR flow for interactive gaining with a second set of QoS requirements, such as priority level=70, packet delay budget=100 ms, etc.

In response, gNB 130 may select PATH-2 based on determination that (RLF2, L2, J2) satisfies the QoS requirements associated with QFI=7. Even though PATH-1 has better quality metrics, PATH-2 is selected because it is sufficient to satisfy the minimum QoS requirements. Next, gNB 130 may generate and send an encapsulated packet (O2*, P2) over user plane tunnel 103 (N3 interface). The outer header (O2*) may specify OUTER_SPN=B to influence the underlay transport network to forward the packet towards UPF-B 120 and PDN 150 via PATH-2. See 662-663 in FIG. 6.

Using examples of the present disclosure, quality-aware user data forwarding may be implemented to better utilize the bandwidth available in telco cloud network. Also, rate limitation enforced per flow on the underlying telco cloud may be overcome or reduced. Various packet flows with different QoS requirements may be better load balanced among the available network paths. This helps achieve better performance in mobile packet core user plane function in 5G systems and beyond.

Quality-Aware User Data Forwarding (Downlink)

Figure 7A:
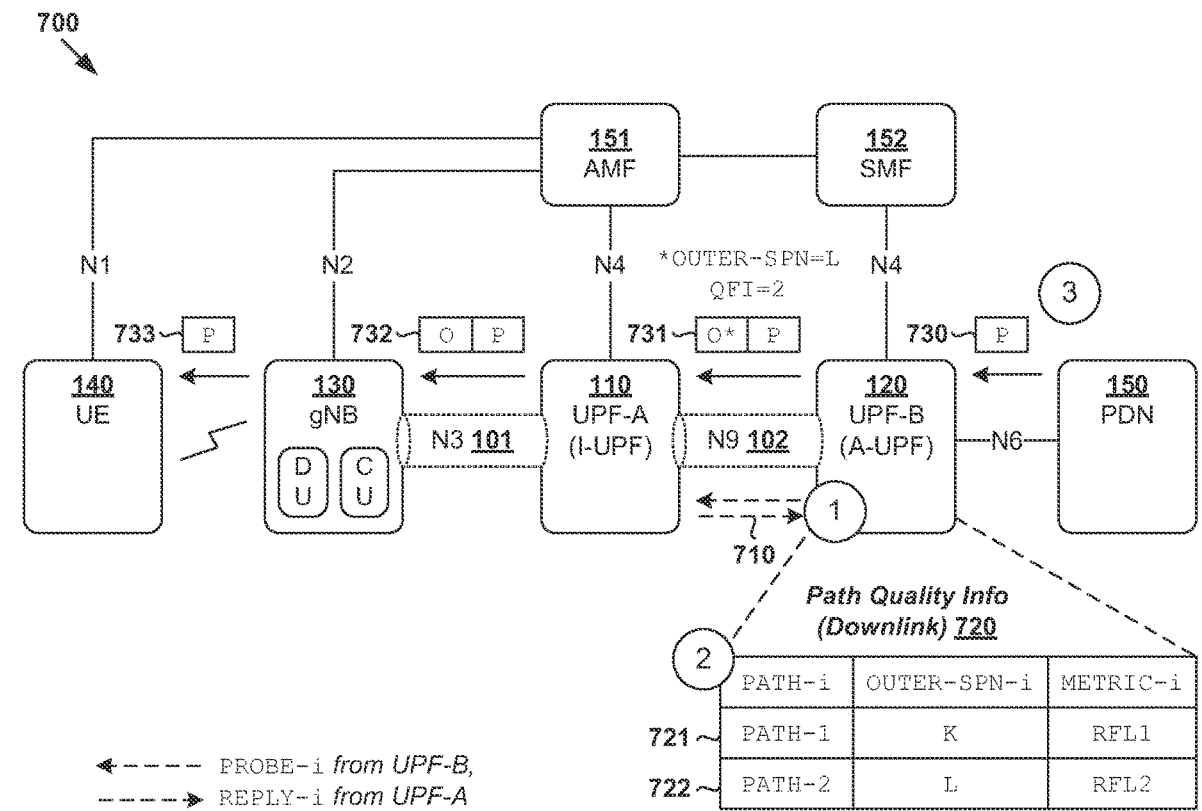
FIG. 7A is a schematic diagram illustrating a first example mobile communications system in which quality-aware user data forwarding may be performed for a downlink direction on an N9 interface.
Figure 7B:
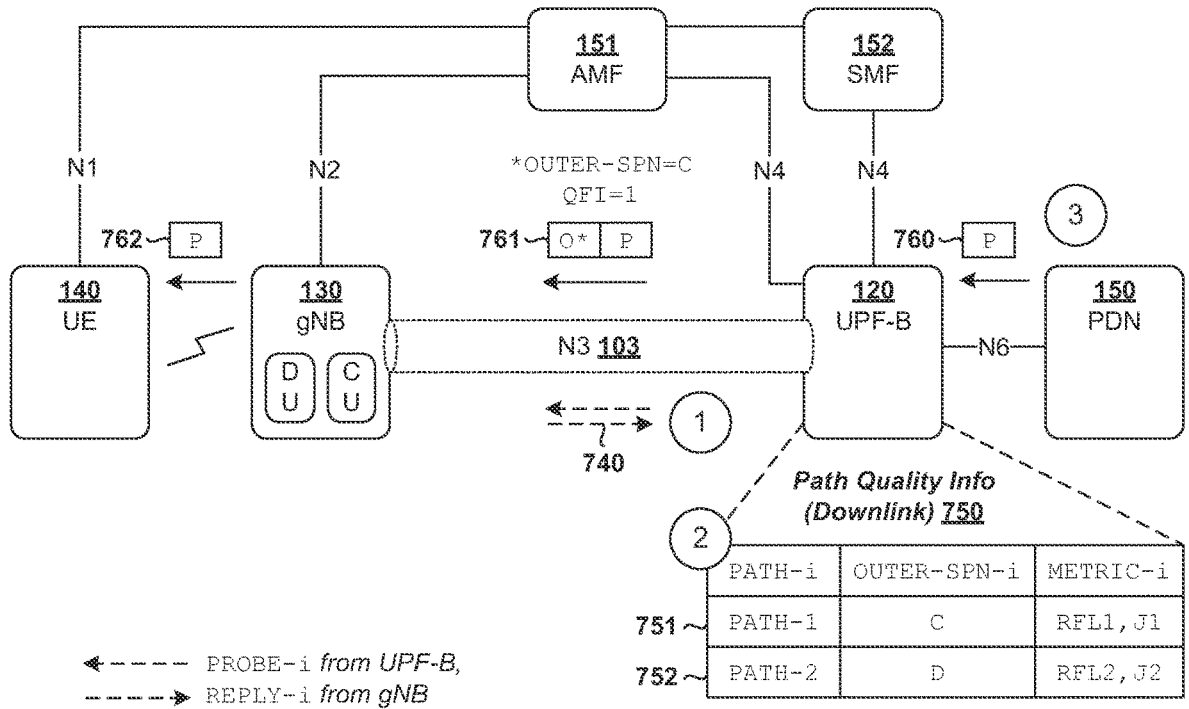
FIG. 7B is a schematic diagram illustrating a second example mobile communications system in which quality-aware user data forwarding may be performed for a downlink direction on an N3 interface.

As discussed using 304-306 in FIG. 3, examples of the present disclosure may be implemented by any suitable pair of "first VNF instance" and "second VNF instance" for a downlink direction (i.e., from PDN 150 towards UE 140). Some examples will be discussed using FIGS. 7A-B. In particular, FIG. 7A is a schematic diagram illustrating first example mobile communications system 700 in which quality-aware user data forwarding may be performed for a downlink direction on an N9 interface. FIG. 7B is a schematic diagram illustrating a second example mobile communications system in which quality-aware user data forwarding may be performed for a downlink direction on an N3 interface. In the following, a "first VNF instance" may be configured to perform blocks 410-427, 430-470, and a "second VNF instance" to perform blocks 415, 430-436 in FIG. 4. Implementation details discussed using FIGS. 4-6 are also applicable here for the downlink direction and not repeated in full for simplicity.

(a) In the example in FIG. 7A, first VNF instance=UPF-B 120 may initiate intelligent probing by generating and forwarding probe packets via respective multiple paths towards second VNF instance=UPF-A 110. Based on reply packets from UPF-A 110, UPF-B 120 may learn path quality information 720 for downlink forwarding. For example, at 721 (i=1), a first mapping is between a first outer source port number (e.g., K) and a first quality metric (e.g., RLF1) associated with a first path. At 722 (i=2), a second mapping is between a second outer source port number (e.g., L) and a second quality metric (e.g., RLF2) associated with a second path. See 710, 720-722 in FIG. 7.

In response to detecting a packet (P) associated with a PDU session and destined for UE 140, UPF-B 120 may perform path selection based on path quality information 720 and/or QoS profile information associated with the PDU session. In this case, UPF-B 120 may generate and send encapsulated packet 731 towards UPF-A 110 over user plane tunnel 102. Encapsulated packet 731 may include the packet (P) and an outer header (O*) specifying the first outer source port number (e.g., K) associated with the selected path. See 730-733 in FIG. 7A.

(b) Further, in the example in FIG. 7A, first VNF instance=UPF-A 110 may initiate intelligent probing by generating and forwarding probe packets via respective multiple paths towards second VNF instance=gNB 130. Based on reply packets from, UPF-A 110 may learn path quality information for downlink forwarding towards gNB 130. This way, path selection may be performed based on the path quality information (not shown for simplicity) and/or QoS profile information. Similarly, UPF-A 110 may generate and send encapsulated packet(s) towards gNB 130 over user plane tunnel 101. Each encapsulated packet may include a packet (P) and an outer header (O*) specifying an outer source port number associated with a selected path.

(c) Turning now to the example in FIG. 7B, first VNF instance=UPF-B 120 may initiate intelligent probing by generating and forwarding probe packets towards second VNF instance=gNB 130. Based on reply packets from gNB 130, UPF-B 120 may learn path quality information 750 for downlink forwarding. For example, at 751 (i=1), a first mapping is between a first outer source port number (e.g., C) and a first quality metric (e.g., RLF1, J1) associated with a first path. At 752 (i=2), a second mapping is between a second outer source port number (e.g., D) and a second quality metric (e.g., RLF2, J1) associated with a second path. See 740, 750-752 in FIG. 7.

In response to detecting a packet (P) destined for UE 140, UPF-B 120 may perform path selection based on path quality information 750 and/or QoS profile information associated with the packet. In this case, UPF-B 120 may generate and send encapsulated packet 761 towards gNB 130 over user plane tunnel 103. Encapsulated packet 761 may include the packet (P) and an outer header (O*) specifying the first outer source port number (e.g., C) associated with the selected path. See 760-762 in FIG. 7B.

For both the uplink direction and downlink direction, the packet may include user data associated with a PDU session initiated by mobile UE 140. For example, uplink user data associated with the PDU session may be sent from mobile UE 140 to a destination in PDN 150. The destination may then respond with downlink user data destined for mobile UE 140. Alternatively, downlink user data forwarding may involve network-initiated packet data protocol (PDP) context in 3G, network-triggered create bearer request in 4G, network-triggered service request in 5G, etc. For a packet to reach UE 140, it needs to have an active PDN session. When a packet reaches the PDN 150 and does not have an active PDN session, then the network may set up the PDN session first before forwarding the packet towards UE 140. For example using 4G, UE 140 may have a default bearer setup. At setup, the PDN session is associated with QoS profile information, which may be default QoS or subscribed QoS. Similar concepts may be found in different systems (3G/4G/5G). In general, UE 140 may be associated with one PDU session and the network may trigger new request based on application requirements.

Container Implementation

Although discussed using VMs 231-234, it should be understood that quality-aware user data forwarding may be performed using VNF instances that are implemented using containers. The term "container" (also known as "container instance" or "containerized application") is used generally to describe an application that is encapsulated with all its dependencies (e.g., binaries, libraries, etc.). For example, multiple containers may be executed as isolated processes inside VM1 231, where a different VNIC is configured for each container. Each container is "OS-less", meaning that it does not include any OS that could weigh 11 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1A to FIG. 7B. For example, a computer system capable of acting as host 210A/210B to support VNF instance(s) may be deployed in SDN environment 200 to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

I claim:

1. A method for a computer system to perform quality-aware user data forwarding in a mobile communications system, wherein the computer system supports a first virtualized network function (VNF) instance, and the method comprises:
- establishing, by the first VNF instance, a user plane tunnel with a second VNF instance to provide user plane connectivity between a mobile user equipment and a packet data network;
- learning, by the first VNF instance, path quality information associated with multiple paths over the user plane tunnel, wherein the path quality information specifies (a) a first mapping between a first outer source port number and a first quality metric associated with a first path, and (b) a second mapping between a second outer source port number and a second quality metric associated with a second path; and
- in response to receiving, by the first VNF instance, a packet that includes user data for forwarding in an uplink direction from the mobile user equipment towards the packet data network, or a downlink direction from the packet data network towards the mobile user equipment,
  - selecting, by the first VNF instance, the first path over the second path based on at least the path quality information; and
  - generating and forwarding, by the first VNF instance, an encapsulated packet towards the second VNF instance over the user plane tunnel, wherein the encapsulated packet includes the packet and an outer header specifying the first outer source port number in the first mapping such that the encapsulated packet is forwarded via the first path.

2. The method of claim 1, wherein selecting the first path comprises:
- identifying quality of service (QoS) profile information associated with a packet data unit (PDU) session; and
- selecting the first path based on the path quality information and the QoS profile information.

3. The method of claim 2, wherein selecting the first path comprises:
- identifying the QoS profile information that includes a QoS flow identifier (QFI), wherein the QFI indicates that the packet is associated with one of the following: guaranteed bit rate (GBR) flow, non-GBR flow, and delay-critical GBR flow.

4. The method of claim 3, wherein selecting the first path comprises:
- selecting the first path in response to determination that the first quality metric satisfies one or more of the following QoS requirements associated with the QFI: priority level, packet delay budget, packet error rate, averaging window and maximum data burst volume.

5. The method of claim 1, wherein establishing the user plane tunnel comprises:
- establishing the user plane tunnel between (a) the first VNF instance in the form of a first user plane function (UPF), and (b) the second VNF instance in the form of a second UPF connecting the first UPF with the packet data network.

6. The method of claim 1, wherein establishing the user plane tunnel comprises:
- establishing the user plane tunnel between (a) the first VNF instance in the form of a radio access network, and (b) the second VNF instance in the form of a UPF connecting the radio access network with the packet data network.

7. The method of claim 1, wherein learning the path quality information comprises:
- generating and forwarding (a) a first probe packet specifying the first outer source port number and (b) a second probe packet specifying the second outer source port number towards the second VNF instance; and
- determining (a) the first quality metric based on a first reply packet responsive to the first probe packet, and (b) the second quality metric based on a second reply packet responsive to the second probe packet, wherein the first probe packet, the second probe packet, the first reply packet and the second reply packet are echo messages that are generated based on a user plane tunnelling protocol.

8. A non-transitory computer-readable storage medium that includes a set of instructions which, in response to execution by a processor of a first computer system, cause the processor to perform a method of quality-aware user data forwarding in a mobile communications system, wherein the method comprises:
- establishing, by the first VNF instance, a user plane tunnel with a second VNF instance to provide user plane connectivity between a mobile user equipment and a packet data network;
- learning, by the first VNF instance, path quality information associated with multiple paths over the user plane tunnel, wherein the path quality information specifies (a) a first mapping between a first outer source port number and a first quality metric associated with a first path, and (b) a second mapping between a second outer source port number and a second quality metric associated with a second path; and
- in response to receiving, by the first VNF instance, a packet that includes user data for forwarding in an uplink direction from the mobile user equipment towards the packet data network, or a downlink direction from the packet data network towards the mobile user equipment,
  - selecting, by the first VNF instance, the first path over the second path based on at least the path quality information; and
  - generating and forwarding, by the first VNF instance, an encapsulated packet towards the second VNF instance over the user plane tunnel, wherein the encapsulated packet includes the packet and an outer header specifying the first outer source port number in the first mapping such that the encapsulated packet is forwarded via the first path.

9. The non-transitory computer-readable storage medium of claim 8, wherein selecting the first path comprises:
- identifying quality of service (QoS) profile information associated with a packet data unit (PDU) session; and
- selecting the first path based on the path quality information and the QoS profile information.

10. The non-transitory computer-readable storage medium of claim 9, wherein selecting the first path comprises:
- identifying the QoS profile information that includes a QoS flow identifier (QFI), wherein the QFI indicates that the packet is associated with one of the following: guaranteed bit rate (GBR) flow, non-GBR flow, and delay-critical GBR flow.

11. The non-transitory computer-readable storage medium of claim 10, wherein selecting the first path comprises:
selecting the first path in response to determination that the first quality metric satisfies one or more of the following QoS requirements associated with the QFI: priority level, packet delay budget, packet error rate, averaging window and maximum data burst volume.

12. The non-transitory computer-readable storage medium of claim 8, wherein establishing the user plane tunnel comprises:
establishing the user plane tunnel between (a) the first VNF instance in the form of a first user plane function (UPF), and (b) the second VNF instance in the form of a second UPF connecting the first UPF with the packet data network.

13. The non-transitory computer-readable storage medium of claim 8, wherein establishing the user plane tunnel comprises:
establishing the user plane tunnel between (a) the first VNF instance in the form of a radio access network, and (b) the second VNF instance in the form of a UPF connecting the radio access network with the packet data network.

14. The non-transitory computer-readable storage medium of claim 8, wherein learning the path quality information comprises:
generating and forwarding (a) a first probe packet specifying the first outer source port number and (b) a second probe packet specifying the second outer source port number towards the second VNF instance; and
determining (a) the first quality metric based on a first reply packet responsive to the first probe packet, and (b) the second quality metric based on a second reply packet responsive to the second probe packet, wherein the first probe packet, the second probe packet, the first reply packet and the second reply packet are echo messages that are generated based on a user plane tunnelling protocol.

15. A computer system to perform quality-aware user data forwarding in a mobile communications system, wherein the computer system comprises:
a processor; and
a non-transitory computer-readable medium having stored thereon instructions that, when executed by the processor, cause the processor to implement a first virtualized network function (VNF) instance and to perform the following:
establish a user plane tunnel between the first VNF instance and a second VNF instance to provide user plane connectivity between a mobile user equipment and a packet data network;
learn path quality information associated with multiple paths over the user plane tunnel, wherein the path quality information specifies (a) a first mapping between a first outer source port number and a first quality metric associated with a first path, and (b) a second mapping between a second outer source port number and a second quality metric associated with a second path; and
in response to receiving, by the first VNF instance, a packet that includes user data for forwarding in an uplink direction from the mobile user equipment towards the packet data network, or a downlink direction from the packet data network towards the mobile user equipment,
select the first path over the second path based on at least the path quality information; and
generate and send an encapsulated packet towards the second VNF instance over the user plane tunnel, wherein the encapsulated packet includes the packet and an outer header specifying the first outer source port number in the first mapping such that the encapsulated packet is forwarded via the first path.

16. The computer system of claim 15, wherein the instructions for selecting the first path cause the processor to:
identify quality of service (QoS) profile information associated with a packet data unit (PDU) session; and
select the first path based on the path quality information and the QoS profile information.

17. The computer system of claim 16, wherein the instructions for selecting the first path cause the processor to:
identify the QoS profile information that includes a QoS flow identifier (QFI), wherein the QFI indicates that the packet is associated with one of the following: guaranteed bit rate (GBR) flow, non-GBR flow, and delay-critical GBR flow.

18. The computer system of claim 17, wherein the instructions for selecting the first path cause the processor to:
select the first path in response to determination that the first quality metric satisfies one or more of the following QoS requirements associated with the QFI: priority level, packet delay budget, packet error rate, averaging window and maximum data burst volume.

19. The computer system of claim 15, wherein the instructions for establishing the user plane tunnel cause the processor to:
establish the user plane tunnel between (a) the first VNF instance in the form of a first user plane function (UPF), and (b) the second VNF instance in the form of a second UPF connecting the first UPF with the packet data network.

20. The computer system of claim 15, wherein the instructions for establishing the user plane tunnel cause the processor to:
establish the user plane tunnel between (a) the first VNF instance in the form of a radio access network, and (b) the second VNF instance in the form of a UPF connecting the radio access network with the packet data network.

21. The computer system of claim 15, wherein the instructions for learning the path quality information cause the processor to:
generate and send (a) a first probe packet specifying the first outer source port number and (b) a second probe packet specifying the second outer source port number towards the second VNF instance; and
determine (a) the first quality metric based on a first reply packet responsive to the first probe packet, and (b) the second quality metric based on a second reply packet responsive to the second probe packet, wherein the first probe packet, the second probe packet, the first reply packet and the second reply packet are echo messages that are generated based on a user plane tunnelling protocol.

* * * * *